United States Patent
Ducker, III et al.

(10) Patent No.: US 6,902,366 B2
(45) Date of Patent: Jun. 7, 2005

(54) SEALABLE FASTENER WITH CIRCUMFERENTIAL SEALANT CHANNEL AND SEALANT DELIVERY GROOVE FOR DELIVERING SEALANT INTO THE CIRCUMFERENTIAL SEALANT CHANNEL

(76) Inventors: Andrew L. Ducker, III, 9604 NW. 28th St., Coral Springs, FL (US) 33065; Frank L. Kubler, 13261 SW. 54th Ct., Miramar, FL (US) 33027

( * ) Notice: Subject to any disclaimer, the term of this patent is extended or adjusted under 35 U.S.C. 154(b) by 0 days.

(21) Appl. No.: 10/638,455

(22) Filed: Aug. 11, 2003

(65) Prior Publication Data

US 2004/0033120 A1 Feb. 19, 2004

Related U.S. Application Data

(60) Division of application No. 09/982,400, filed on Oct. 18, 2001, now Pat. No. 6,604,899, which is a continuation-in-part of application No. 09/931,697, filed on Aug. 15, 2001, now abandoned.

(51) Int. Cl.[7] ............................................... F16B 39/00
(52) U.S. Cl. ........................ 411/82.1; 411/258; 411/418
(58) Field of Search ........................ 411/82–82.3, 930, 411/258, 417–472

(56) References Cited

U.S. PATENT DOCUMENTS

| | | | | |
|---|---|---|---|---|
| 2,550,357 A | * | 4/1951 | Jansen et al. ............... | 411/399 |
| 3,140,967 A | * | 7/1964 | Jansen ........................... | 156/91 |
| 3,434,743 A | * | 3/1969 | Boeker .......................... | 285/39 |
| 3,472,301 A | * | 10/1969 | Pearce, Jr. .................... | 411/258 |
| 4,063,582 A | * | 12/1977 | Fischer ........................ | 411/82.1 |
| 4,681,477 A | * | 7/1987 | Fischer ........................ | 403/298 |
| 4,902,180 A | * | 2/1990 | Gauron ........................ | 411/82.1 |
| 4,945,625 A | * | 8/1990 | Winston ..................... | 29/524.1 |
| 5,104,266 A | * | 4/1992 | Daryoush et al. .......... | 405/259.5 |
| 5,170,606 A | * | 12/1992 | Popp ............................ | 52/707 |
| 5,328,300 A | * | 7/1994 | Fischer et al. ............ | 405/259.6 |
| 6,588,999 B2 | * | 7/2003 | Kubler et al. ............... | 411/82.1 |

* cited by examiner

*Primary Examiner*—Flemming Saether
(74) *Attorney, Agent, or Firm*—Frank L. Kubler

(57) ABSTRACT

A sealable fastener for insertion into an fastener opening in a receiving structure includes a fastener shank with a shank first end having a shank first end wall and a shank second end having a shank second end wall, a shank side wall extending between the shank first end wall and the shank second end wall and a circumferential channel recessed into the shank side wall; and a sealant delivery groove in the shank side wall having a delivery groove entry port in the shank second end and extending to a delivery groove exit port opening into the circumferential channel; so that a flowable sealant placed in the fastener opening is drivable into the sealant delivery groove and around the circumferential channel as the fastener shank is inserted into the fastener opening, creating a circumferential seal between the fastener shank and the receiving structure fastener opening.

5 Claims, 5 Drawing Sheets

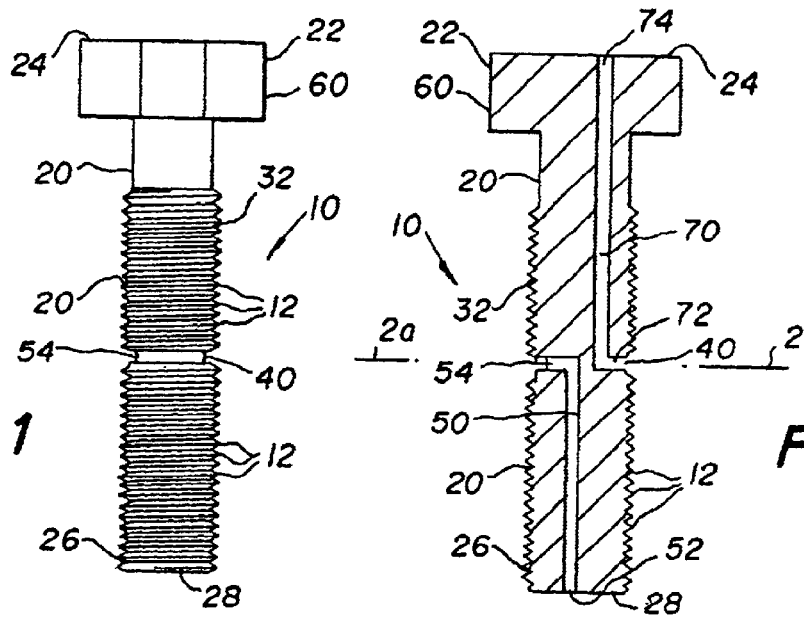
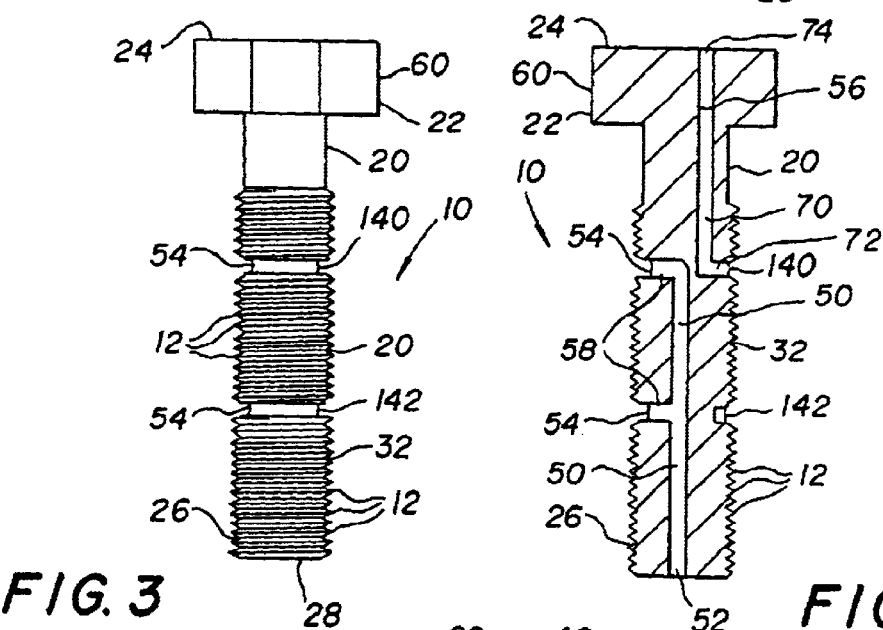
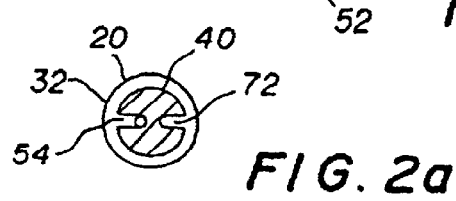

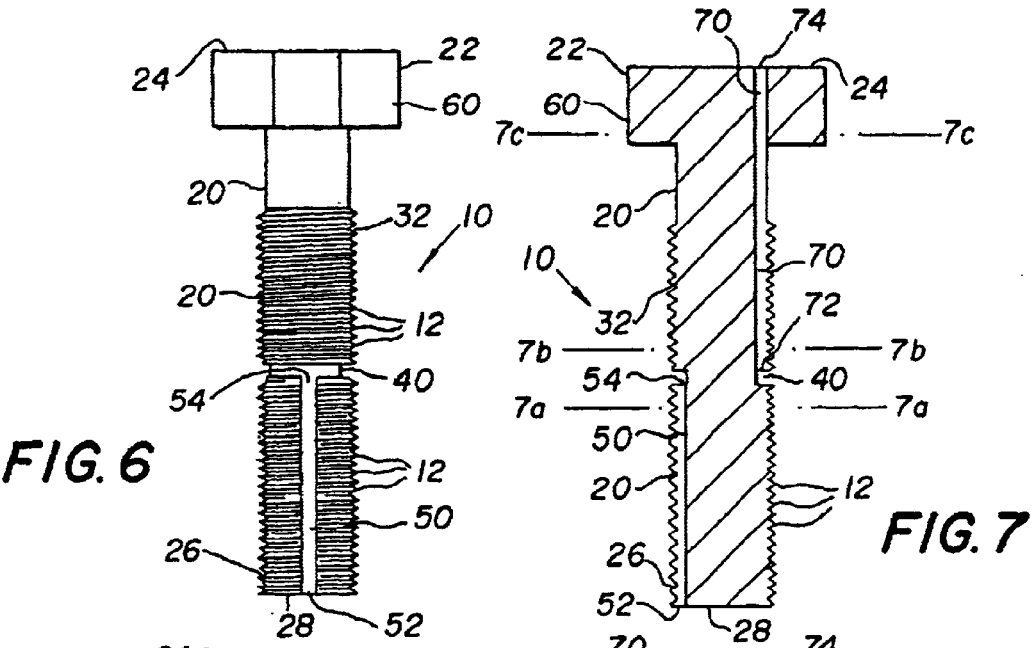

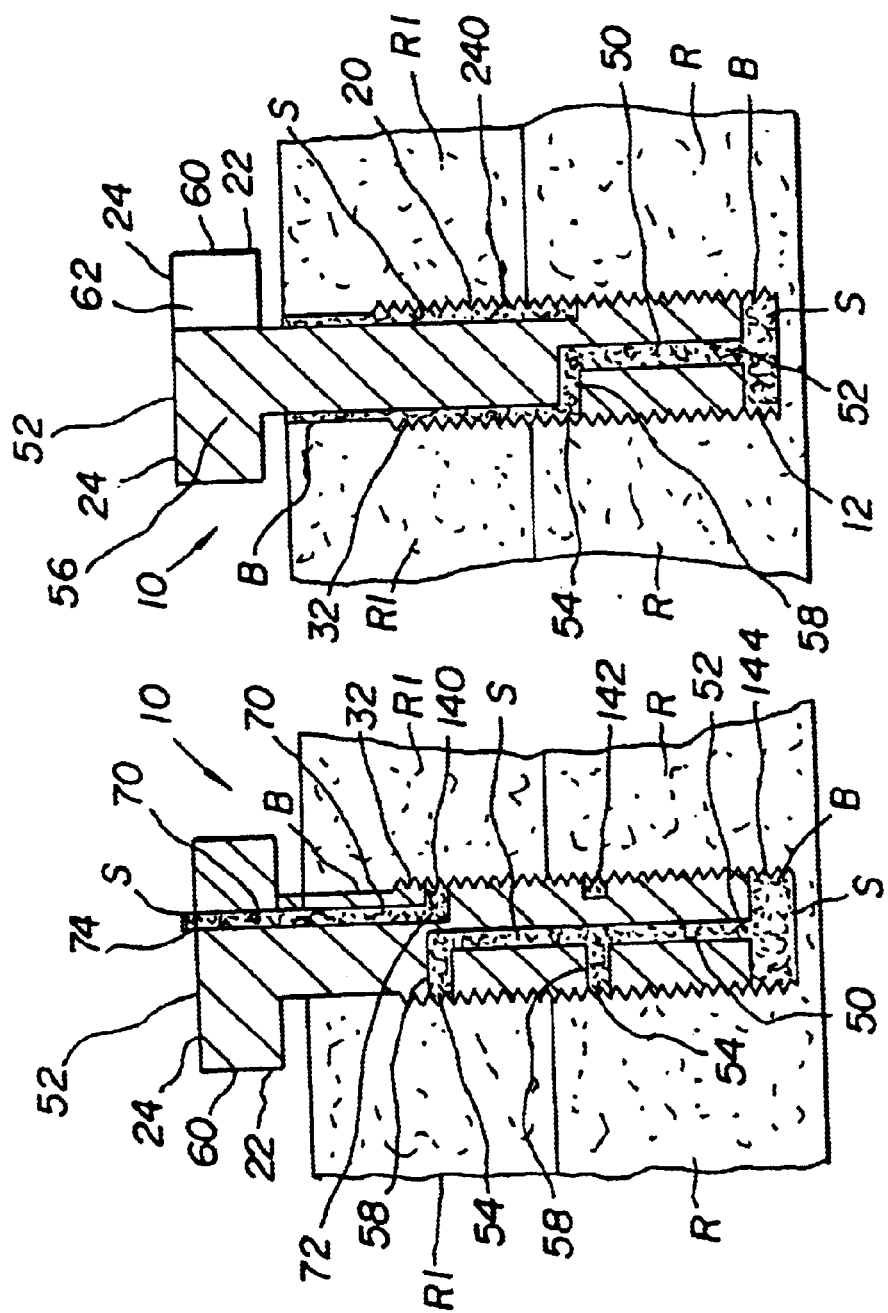

SEALABLE FASTENER WITH CIRCUMFERENTIAL SEALANT CHANNEL AND SEALANT DELIVERY GROOVE FOR DELIVERING SEALANT INTO THE CIRCUMFERENTIAL SEALANT CHANNEL

FILING HISTORY

This application is a based in part upon the disclosure contained within disclosure document number 495,287 filed on Jun. 13, 2001, and a continuation-in-part of application Ser. No. 09/931,697, filed on Aug. 15, 2001, now abandoned, and a divisional of application Ser. No. 09/982,400 filed on Oct. 18, 2001, and issuing into U.S. Pat. No. 6,604,899 on Aug. 12, 2003.

BACKGROUND OF THE INVENTION

1. Field of the Invention

The present invention relates generally to the field of fasteners such as bolts, screws, rivets and nails. More specifically the present invention relates to a sealable fastener including a fastener shank having a shank first end for engagement by a fastener insertion tool and having a shank second end for embedding into a receiving structure, the shank first end having a shank first end wall and the shank second end having a shank second end wall; a longitudinal shank side wall and a continuous, fully circumferential channel recessed into the shank side wall; and including a longitudinally extending sealant delivery groove in the shank side wall for delivering sealant into the circumferential channel. For applications in which the fastener bore in a receiving structure terminates within a solid portion of the receiving structure, such as a boat hull, a first embodiment is provided in which the sealant delivery groove has a groove entry port in the shank second end and extending longitudinally to a groove exit port opening into the circumferential channel. A seal confirmation passageway which may be in the form of a groove is optionally provided which extends from a confirmation passageway enter port in the circumferential channel to the shank first end where it opens out of a confirmation passageway exit port.

Sealant is first injected into a fastener bore. Then the fastener shank is screwed, driven or slid into the fastener bore so that the shank second end bears against and compresses the sealant within the fastener bore so that the sealant is forced into the sealant delivery groove and flows through the sealant delivery groove and into and around the circumferential channel, creating a circumferential seal between the fastener shank and the receiving structure so that water or other liquid cannot flow around the fastener shank and through the receiving structure.

Where absolute confirmation of a complete seal is required, the seal confirmation passageway, which is in the form of a bore or a groove, is provided. After sealant flows from the sealant delivery passageway and around the circumferential channel, the s alant flows out of the circumferential channel into the confirmation passageway entry port and along the seal confirmation passageway until the sealant is exposed at or exits from a confirmation passageway exit port in the shank first end.

2. Description of the Prior Art

There have long been fasteners having fastener shanks for extending into and interconnecting multiple discrete fastener receiving structures. These prior fasteners have included bolts, screws, rivets, pins and nails. A problem with these prior fasteners has been that no truly effective means has been provided for creating a seal between the shank of the fastener and the receiving structure to reliably prevent liquid from flowing along the shank from one side of the receiving structure to the other. This problem is particularly noteworthy in the marine industry and is probably the most common cause of leakage in boat hulls.

It is thus an object of the present invention to provide a fastener which includes a shank for passing into a receiving structure including means in the form of a longitudinal sealant delivery groove in the shank side wall for reliably delivering flowable sealant circumferentially around the shank, preferably into a circumferential channel, creating a circumferential seal between the shank and the receiving structure, thereby preventing flow of liquid along the shank and through the receiving structure.

It is another object of the present invention to provide such a fastener which may take any conventional form, such as a bolt, screw, rivet, pin or nail.

It is still another object of the present invention to provide such a fastener which is inserted into a receiving structure in the same way and with the same tool or tools used to insert an otherwise similar fastener, and through which a flowable sealant can be rapidly, easily and reliably delivered.

It is finally an object of the present invention to provide such a fastener which is relatively inexpensive to manufacture and to install in a receiving structure.

SUMMARY OF THE INVENTION

The present invention accomplishes the above-stated objectives, as well as others, as may be determined by a fair reading and interpretation of the entire specification.

A sealable fastener is provided for insertion into an fastener opening in a receiving structure, the sealable fastener including a fastener shank including a shank first end having a shank first end wall and a shank second end having a shank second end wall, a shank side wall extending between the shank first end wall and the shank second end wall and a circumferential channel recessed into the shank side wall; and a sealant delivery groove in the shank side wall having a delivery groove entry port in the shank second end and extending to a delivery groove exit port opening into the circumferential channel; so that a flowable sealant placed in the fastener opening is drivable into the delivery groove entry port as the fastener shank is inserted into the fastener opening, so that the sealant flows through the sealant delivery groove and exits through the delivery groove exit port and flows into and around the circumferential channel, creating a circumferential seal between the fastener shank and the fastener opening in the receiving structure.

A sealable fastener is additionally provided for insertion into an opening in a receiving structure, the sealable fastener including a fastener shank including a shank first end having a fastener head and a shank first end wall, and a shank second end having a shank second end wall, a shank side wall extending between the shank first end and the shank second end and a circumferential channel in the shank side wall extending to one of the fastener head and the shank second end; a sealant delivery groove in th shank side wall having a delivery groove entry port in the shank second end and extending to a delivery groove exit port opening into the circumferential channel; and a seal confirmation groove including one of a radial notch and a confirmation passageway in the fastener head opening out of the shank first end; so that a flowable sealant placed in the fastener opening is drivable into the delivery groove entry port as the fastener shank is inserted into the fastener opening, and so that the sealant flows through the sealant delivery groove and exits through the delivery groove exit port and flows into and around the circumferential channel, creating a circumferential seal between the fastener shank and the opening in the receiving structure, and then flows to the shank first end through the seal configuration groove to become visible at the shank first end and thus to indicate that a complete seal has been achieved.

A sealable fastener is still additionally provided for insertion into an fastener opening in a receiving structure, the sealable fastener including a fastener shank including a shank first end having a shank first end wall and a shank second end having a shank second end wall, a shank side wall extending between the shank first end wall and the shank second end wall and a circumferential channel recessed into the shank side wall; and a sealant delivery groove in the shank side wall having a delivery groove entry port in the shank first end and extending to a delivery groove exit port opening into the circumferential channel; so that a flowable sealant is injectable into the delivery groove entry port, so that the sealant flows through the sealant delivery groove and exits through the delivery groove exit port and flows into and around the circumferential channel, creating a circumferential seal between the fastener shank and the opening in the receiving structure.

A sealable fastener is yet additionally provided for insertion into an opening in a receiving structure, the sealable fastener including a fastener shank including a shank first end having a fastener head and a shank first end wall and a shank second end having a shank second end wall, a shank side wall extending between the shank first end wall and the shank second end wall and a circumferential channel in the shank side wall extending to one of the fastener head and the shank second end; a sealant delivery groove in the shank side wall having a delivery groove entry port in the shank first end and extending to a delivery groove exit port opening into the circumferential channel; and a seal confirmation groove having a confirmation groove entry port in the circumferential channel and extending to a confirmation groove exit port in the shank first end; so that a flowable sealant is injectable into the delivery groove entry port, so that the sealant flows through the sealant delivery groove and exits through the delivery groove exit port and flows into and around the circumferential channel, creating a circumferential seal between the fastener shank and the opening in the receiving structure; and so that the sealant flows from the circumferential channel into the confirmation groove entry port, and then flows to the shank first end through the seal confirmation groove to become visible at the shank first end and thus to indicate that a complete seal has been achieved.

BRIEF DESCRIPTION OF THE DRAWINGS

Various other objects, advantages, and features of the invention will become apparent to those skilled in the art from the following discussion taken in conjunction with the following drawings, in which:

FIG. 1 is a side view of a fastener having the sealant channel and shank second end delivery passageway and the seal confirmation passageway of the first embodiment.

FIG. 2 is a cross-sectional side view of the fastener of FIG. 1, revealing the sealant delivery passageway and seal confirmation passageway. FIG. 2a is a cross-sectional view of the shank of the fastener of FIG. 2, taken along line 2a—2a.

FIG. 3 is a side view as in FIG. 1 of a double channel embodiment of the fastener.

FIG. 4 is a cross-sectional side view of the fastener of FIG. 3, revealing the sealant delivery and seal confirmation passageways.

FIG. 5 is a cross-sectional side view of the open ended channel embodiment of the inventive fastener fit through bores in two abutting receiving structures, showing flowable sealant being injected by the nozzle of an adhesive gun and circumferentially filling the open ended channel to create a seal.

FIG. 6 is a side view of a fastener having the sealant circumferential channel and shank second end delivery groove and the seal confirmation groove and passageway of the first embodiment.

FIG. 7 is a cross-sectional side view of the fastener of FIG. 6, revealing the sealant delivery groove and seal confirmation groove and passageway. FIG. 7a is a cross-sectional view of the shank of the fastener of FIG. 7 taken along line 7a—7a, showing the sealant delivery groove. FIG. 7b is a cross-sectional view of the shank of the fastener of FIG. 7 taken along line 7b—7b, showing the groove portion of the seal confirmation groove-passageway. FIG. 7c is a cross-sectional view of the shank of the fastener of FIG. 7 taken along line 7c—7c, showing the bore portion of the seal confirmation groove-passageway.

FIG. 8 is a side view as in FIG. 6 of a double channel embodiment of the fastener.

FIG. 9 is a cross-sectional side view of the fastener of FIG. 8, revealing the segmented sealant delivery groove and seal confirmation groove and passageway.

FIG. 10 is a cross-sectional side view of the open ended channel, extending from the passageway exit port to the fastener head.

DETAILED DESCRIPTION OF THE PREFERRED EMBODIMENTS

Figure 12:
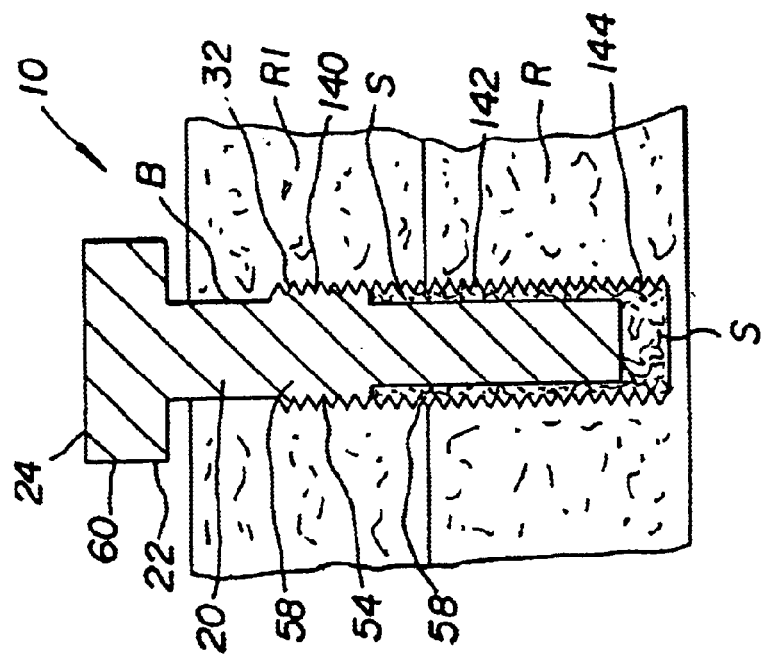
FIG. 12 is a cross-sectional side view of the open ended channel, extending from the shank second end to a point beyond the interface between two receiving structures being interconnected by the inventive fastener.

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Reference is now made to the drawings, wherein like characteristics and features of the present invention shown in the various FIGURES are designated by the same reference numerals.

First Preferred Embodiment

A first embodiment is provided primarily for applications in which a fastener bore B in a receiving structure terminates within the receiving structure, such as a boat hull. The receiving structure may be a composite receiving structure including a proximal receiving structure R1 through which a segment of fastener bore B passes completely and a distal receiving structure R in which the remainder of fastener bore B penetrates and then terminates. Referring to FIGS. 1–4, a sealable fastener 10 is disclosed including a fastener shank 20 having a shank first end 22 for engagement by a fastener insertion tool and having a shank second end 26 for embedding into a receiving structure R, the shank first end 22 having a shank first end wall 24 and the shank second end 26 having a shank second end wall 28; a longitudinal shank side wall 32 and a continuous; fully circumferential channel 40 recessed into the shank side wall 32; and including a sealant delivery passageway 50 in the form of a groove in the shank side wall 32 having a delivery passageway entry port 52 in the shank second end 26 and extending longitudinally to a delivery passageway exit port 54 opening into the circumferential channel 40. A seal confirmation passageway 70 is optionally provided which extends from a confirmation passageway entry port 72 in the circumferential channel to the shank first end 22 where it opens out of a confirmation passageway exit port 74.

Method

Sealant S is first injected into the fastener bore B. Then the fastener shank 20 is screwed, driven or slid into the fastener bore so that the shank second end 26 bears against and compresses the sealant S within the fastener bore B so that the sealant S is forced into the sealant delivery passageway 50 and flows through the sealant delivery passageway 50 and into and around the circumferential channel 40, creating a circumferential seal between the fastener shank 20 and the receiving structure R so that water or other liquid cannot flow around the fastener shank 20 and through the receiving structure R. See FIG. 5.

Where absolute confirmation of a complete seal is required, a seal confirmation passageway 70 as described above is provided. After sealant S flows from the sealant delivery passageway 50 and around the circumferential channel 40, the sealant S flows out of the circumferential channel 40 into the confirmation passageway entry port 72 and along the seal confirmation passageway 70 until the sealant S is exposed at or exits from the confirmation passageway exit port 74 in the shank first end 22. The sealant delivery passageway exit port 54 and the seal confirmation passageway entry port 72 preferably open into the circumferential channel 40 at diametrically opposing points so that sealant S from the sealant delivery passageway 50 has to flow all the way around the circumferential channel 40 before entering the seal confirmation passageway 70, to completely assure that the circumferential channel 40 is filled around the entire shank 20 circumference before sealant S is exposed at the confirmation passageway exit port 74 to indicate a complete seal.

The seal confirmation passageway 70 can be either a longitudinal bore in fastener shank 20 as shown in FIGS. 2, 4, 5 and 6 or can be a longitudinal groove along shank side wall 32 as shown in FIGS. 6–9 extending from shank second end 26 to circumferential channel 40, or a combination of groove and passageway. This is also true for the passageway configurations disclosed in the parent application, Ser. No. 09/931,697 the contents of which are incorporated by herein reference.

For the first embodiment of the present application, where the sealant delivery passageway 50 is a longitudinal bore, it can either include a longitudinal segment only which extends directly into a side of the circumferential channel 40, or it can include an axial segment 56 which connects to a radial segment 58 which extends into the bottom of the circumferential channel 40, as shown in FIGS. 2, 4 and 5. Where multiple circumferential channels 140–142 are provided, and where the sealant delivery passageway 50 has only the longitudinal segment which enters a side of a given circumferential channel, the sealant delivery passageway 50 is broken into passageway or groove segments extending between circumferential channels as shown in FIG. 9. Where the seal confirmation passageway 70 is a longitudinal bore, it can either include a rectilinear longitudinal segment only which extends directly from a side of the circumferential channel 40, or it can have an axial segment 76 which connects to a radial segment 78 which extends into the bottom of the circumferential channel 40, as shown in FIGS. 2, 4 and 5. For the embodiments shown in FIGS. 2, 4, 7, and 9, or other variations in which the sealant delivery passageway 50 opens out of the shank second end 26 and the seal confirmation passageway opens out of the shank first end 22, and where the fastener 10 is inserted through one or more receiving structures R until the shank second end 26 protrudes through the receiving structures R and R1, the user has the option of injecting sealant with a sealant injection tool or gun into the seal delivery passageway 50, or into the seal confirmation passageway 70, as may be desired and convenient.

Second Preferred Embodiment

Figure 11:
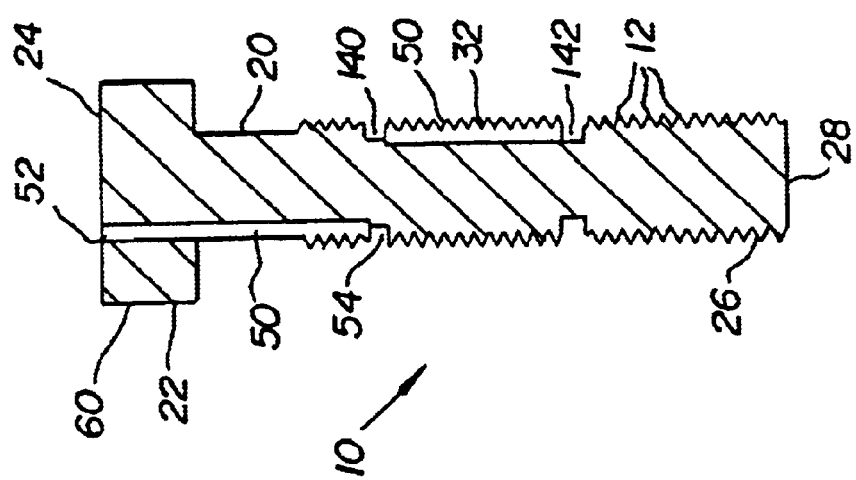
FIG. 11 is a cross-sectional side view of the second embodiment, in which sealant is delivered from the shank first end and in which most of the sealant delivery passageway is replaced with a longitudinal sealant delivery groove, the sealant delivery groove being broken at the first circumferential channel into a diametrically opposed segment.
Figure 11A:
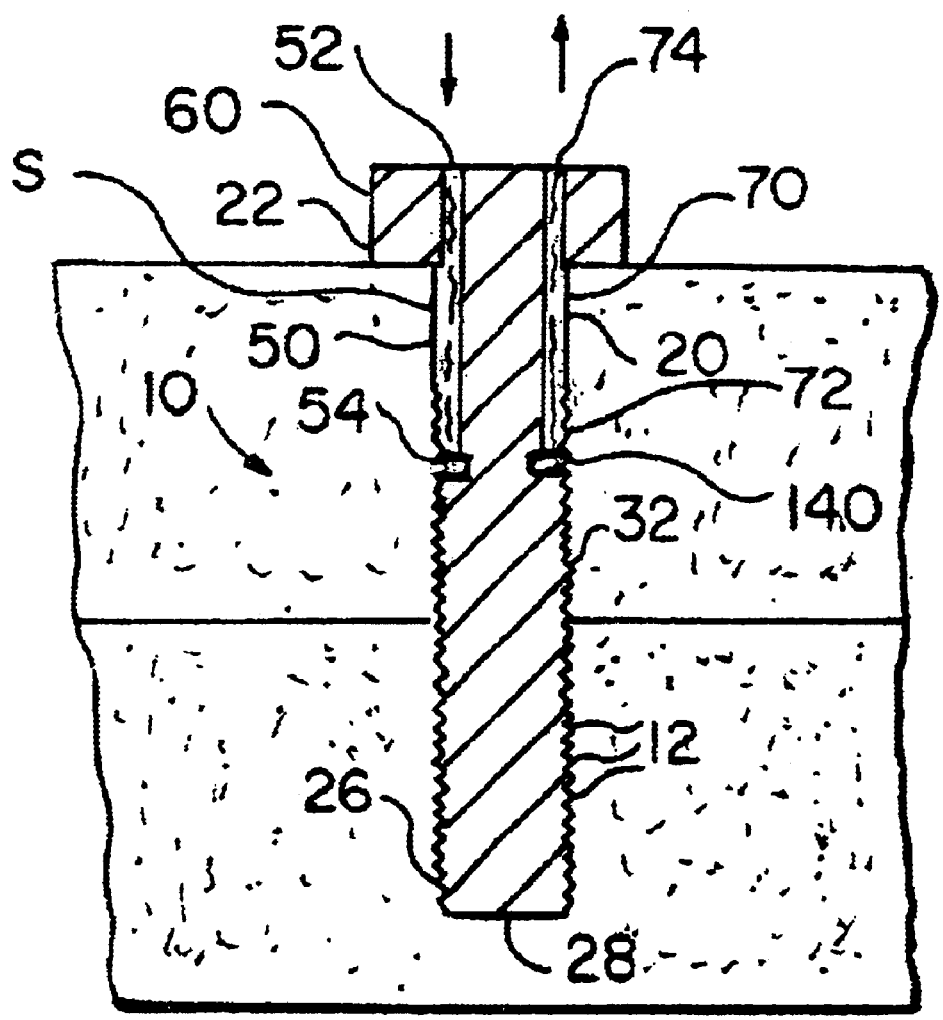
FIG. 11a is a view as in FIG. 11 showing the fastener with the optional confirmation passageway and showing the fastener screwed into a fastener opening in a receiving structure.

A second embodiment of the sealable fastener 10 is disclosed including a fastener shank 20 having a shank first end 22 having a shank first end wall 24 and a shank second end 26 having a shank second end wall 28, a shank side wall 32 extending between shank first end 22 and shank second end 26, a continuous, fully circumferential channel 40 recessed into shank side wall 32, and including a longitudinal sealant delivery groove 50 in shank side wall 32 having a delivery groove entry port 52 in the shank first end 22 and extending longitudinally to a delivery groove exit port 54 opening into circumferential channel 40. A seal confirmation passageway 70 including a longitudinal groove optionally is provided and extends from a confirmation passageway entry port 72 in circumferential channel 40 to a confirmation passageway exit port 74 in shank first end 22. See FIG. 11a Shank first end 22 preferably includes a fastener head 60. Sealant is injected into the delivery groove entry port 52 and flows along the sealant delivery groove 50 to the circumferential channel 40, flows entirely around the circumferential channel 40 and then enters the confirmation groove entry port 72 and flows along the confirmation groove and exits through the confirmation groove exit port 74. This embodiment is analogous to that disclosed in parent application Ser. No. 09/931,697, except that longitudinal grooves replace the bored passageways.

Method

When fastener 10 is to be used, the fastener shank 20 is inserted into a fastener bore B in a receiving structure R such as a boat hull or a nut N. Then a flowable sealant S is injected into delivery groove entry port 52 so that the sealant S flows through sealant delivery groove 50 and exits through delivery groove exit port 54 and flows into and around circumferential channel 40, creating a circumferential seal between fastener shank 20 and the receiving structure R so that water or other liquid cannot flow around the fastener shank 20 and through the receiving structure R. Sealant S injection is preferably preformed by an adhesive dispensing gun, structured much like a conventional caulking gun, examples of which are found in the existing art.

Design Variations of Second Embodiment

The fastener first end 22 has a first head radial notch 62 which registers with the delivery groove 50 and optionally a second head radial notch which registers with confirmation groove 70. Alternatively, fastener first end 22 does not have a fastener head 60.

Circumferential channel 40 preferably is located midway between the shank first and second end walls 24 and 28, respectively, but can be located at virtually any point along shank 20 accessible by delivery groove 50. Various channel 40 widths and depths may be provided, depending upon the type of sealant S used and upon the durability of sealing required for the specific application. Circumferential channel 40 is preferably deeper than any fastener threads 12 on the shank 20. Channel 40 optionally follows an irregular or skewed path around the shank 20.

Where the delivery groove 50 is provided rather than a bore passageway, and multiple circumferential channels are provided, it is preferred that the delivery grooves be staggered on diametrically opposing sides of the shank 20 between circumferential channels 140, 142 and 144 so that one circumferential channel must fill before sealant enters the next channel.

Where multiple circumferential channels 140 and 142 are provided, seal confirmation groove entry port 72 opens out of the most distal channel 142, which is preferably a deeper channel than channel 140 so that seal confirmation groove 70 can extend substantially parallel to the shank axis and yet not intersect or enter channel 140. Since sealant S reaches circumferential channel 140 first, and only then reaches circumferential channel 142 second, the discharge of sealant S through groove 70 indicating that second circumferential channel 142 is filled also indicates that sealant S has filled circumferential channel 140 as well.

Examples of flowable sealants are, but are not limited to, FUSOR SELF-LEVELING SEAM SEALER™, company reference number 122EZ, and LORD™ Urethane Adhesive, company reference numbers 7542A/B and 7545A/B. Fastener 10 is preferably configured as a bolt, but also may be configured as a screw, a pin, or a nail or a rivet (see FIG. 11). While virtually all existing fasteners are circular in cross-section, this sealant S delivery feature is understood to be suited for incorporation into fasteners of other cross-sectional shapes, and thus the term "fastener" is understood to include fasteners of all cross-sectional shapes.

Once again, it is preferred that the first passageway radial segment 58 be wider than the second passageway radial segment 58 and that the first circumferential channel 142 be wider than second circumferential channel 140 and that first circumferential channel 140 be wider than second circumferential channel 142. The reason for these proximally progressive increments in passageway radial segment 58 diameters is that sealant S pressure diminishes as it flows distally, and a wider passageway radial segment 58 helps compensate for this loss in sealant S pressure.

Additional Embodiments

An open end channel 240 may extend from virtually any given point along shank side wall 32 all the way to shank first end 22, where channel 240 is either open, or contained behind a fastener head 60. For this embodiment, sealant S can be delivered either through a delivery passageway 50, or through a delivery groove 50 extending from shank second end 26 or through a radial notch 62 in fastener head 60. See FIG. 10. The depth of open end channel 240 may be equal to and preferably is greater than the depth of the troughs of threads 12.

A seal confirmation groove 70 is optionally provided for indicating when the circumferential channel 40 is filled with sealant S and forms a circumferential seal around the bolt shank 20. A seal confirmation groove entry port 72 opens out of circumferential channel 40 into confirmation groove 70 which extends generally axially along shank side wall 32 to a seal confirmation groove exit port 74 in shank first end 22. Seal confirmation groove entry port 72 preferably opens out of circumferential channel 40 opposite groove 50 so that sealant S only enters groove 70 after flowing all the way around circumferential channel 40 and creating a complete seal.

Still alternatively, an open end channel 240 may extend from virtually any given point along shank side wall 32 all the way to shank second end 24, where channel 240 is open. For this embodiment, sealant S is injected into the fastener bore B first and then the fastener 10 is inserted and sealant S is compressed and flows proximally toward the shank first end 22. See FIG. 12.

While the invention has been described, disclosed, illustrated and shown in various terms or certain embodiments or modifications which it has assumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A sealable fastener and receiving structure comprising:
   a receiving structure having a fastener opening;
   a fastener shank extending into said fastener opening and comprising a shank first end having a fastener head and a shank first end wall and being configured for engagement by a fastener insertion tool, and a shank second end having a shank second end wall, a shank side wall having a fastener thread engaging said fastener opening in said receiving structure, said shank side wall extending between said fastener head and said shank second end wall and having a circumferential channel recessed into said shank side wall;
   and a sealant delivery groove in said shank side wall having a delivery groove entry port in said shank first end extending through said fastener head, said sealant delivery groove extending across said fastener thread to a delivery groove exit port opening into said circumferential channel;
   such that a flowable sealant is injectable into said delivery groove entry port, such that the sealant flows through said sealant delivery groove and exits through said delivery groove exit port and flows into and around said circumferential channel, creating a circumferential seal between said fastener shank and the opening in the receiving structure.

2. The sealable fastener and receiving structure of claim 1, wherein said fastener head protrudes radially outward beyond said shank side wall.

3. A sealable fastener for insertion into an opening in a receiving structure, the sealable fastener comprising:
   a fastener shank comprising a shank first end having a fastener head and a shank first end wall, said shank first end being configured for engagement by a fastener insertion tool, and a shank second end having a shank second end wall, a shank side wall with a fastener thread for engaging a fastener opening in a receiving structure, said shank side wall extending between said fastener head and said shank second end wall and having a circumferential channel in said shank side wall extending to one of said fastener head and said shank second end;

a sealant delivery groove in said shank side wall having a delivery groove entry port in said shank first end extending through said fastener head, said sealant delivery groove extending across said fastener thread to a delivery groove exit port opening into said circumferential channel;

and a seal confirmation groove having a confirmation groove entry port in said circumferential channel and extending to a confirmation groove exit port in said shank first end;

such that a flowable sealant is injectable into said delivery groove entry port, such that the sealant flows through said sealant delivery groove and exits through said delivery groove exit port and flows into and around said circumferential channel, creating a circumferential seal between said fastener shank and the opening in the receiving structure;

and such that the sealant flows from said circumferential channel into said confirmation groove entry port, and then flows to said shank first end through said seal confirmation groove to become visible at said shank first end and thus to indicate that a complete seal has been achieved.

4. The sealable fastener of claim 3, wherein said fastener head protrudes radially outward beyond said shank side wall.

5. A sealable fastener and receiving structure comprising:

a receiving structure having a fastener opening;

a fastener shank extending into said fastener opening and comprising a shank first end having a fastener head and a shank first end wall and being configured for engagement by a fastener insertion tool, and a shank second end having a shank second end wall, a shank side wall having a fastener thread engaging a fastener opening in a receiving structure, said shank side wall extending between said fastener head and said shank second end wall and having a circumferential channel recessed into said shank side wall;

and a sealant delivery groove in said shank side wall having a delivery groove entry port in one of said shank first end and said shank second end and extending across said fastener thread to a delivery groove exit port opening into said circumferential channel;

such that a flowable sealant is injectable into said delivery groove entry port, such that the sealant flows through said sealant delivery groove and exits through said delivery groove exit port and flows into and around said circumferential channel, creating a circumferential seal between said fastener shank and the opening in the receiving structure.

* * * * *